(12) United States Patent
Song et al.

(10) Patent No.: US 6,957,712 B2
(45) Date of Patent: Oct. 25, 2005

(54) ROBOT CLEANER, SYSTEM EMPLOYING THE SAME AND METHOD FOR RE-CONNECTING TO EXTERNAL RECHARGING DEVICE

(75) Inventors: Jeong-gon Song, Kwangju (KR); Jang-youn Ko, Kwangju (KR); Kwang-su Kim, Kwangju (KR)

(73) Assignee: Samsung Gwangju Electronics Co., Ltd., Kwangju (KR)

( * ) Notice: Subject to any disclaimer, the term of this patent is extended or adjusted under 35 U.S.C. 154(b) by 106 days.

(21) Appl. No.: 10/117,925

(22) Filed: Apr. 5, 2002

(65) Prior Publication Data

US 2002/0153185 A1 Oct. 24, 2002

(30) Foreign Application Priority Data

Apr. 18, 2001 (KR) ............................... 2001-20753
Aug. 6, 2001 (KR) ............................... 2001-47287
Aug. 6, 2001 (KR) ............................... 2001-47288

(51) Int. Cl.$^7$ ............................. A47L 9/00; B62D 1/24
(52) U.S. Cl. ...................... 180/167; 180/168; 180/117
(58) Field of Search ................................ 180/167, 168, 180/169, 116, 117, 119; 701/245, 145, 165, 701/169, 179, 180, 182, 206

(56) References Cited

U.S. PATENT DOCUMENTS

| | | | | |
|---|---|---|---|---|
| 4,119,900 A | * | 10/1978 | Kremnitz | 701/23 |
| 4,679,152 A | * | 7/1987 | Perdue | 701/23 |
| 4,933,864 A | * | 6/1990 | Evans et al. | 701/207 |
| 5,155,684 A | | 10/1992 | Burke et al. | |
| 5,440,216 A | * | 8/1995 | Kim | 318/587 |
| 5,682,313 A | * | 10/1997 | Edlund et al. | 342/127 |
| 5,787,545 A | * | 8/1998 | Colens | 15/319 |
| 5,867,800 A | * | 2/1999 | Leif | 701/23 |

(Continued)

FOREIGN PATENT DOCUMENTS

DE 43 40 771 A1 12/1994

(Continued)

*Primary Examiner*—Bryan Fischmann
*Assistant Examiner*—Bridget Avery
(74) *Attorney, Agent, or Firm*—Jeffrey D. Moy; Harry M. Weiss; Weiss, Moy & Harris, P.C.

(57) ABSTRACT

A robot cleaner capable of returning to an external recharging device. The robot cleaner includes a driving portion for driving a plurality of wheels, at least one camera installed on a body of the robot cleaner, the camera for photographing external surroundings, and a controller for photographing an image through a camera for recognition of a connection position where the external recharging device is connected with the robot cleaner and stores the photographed image, and controls the driving portion so that the robot cleaner can move from the external recharging device to a destination when an operation start signal is received in the robot cleaner connected to the external recharging device, and for tracing a path to the connection position of the external recharging device and the robot cleaner during a robot cleaner's return to the external recharging device while comparing a current image currently taken by the camera with a stored image of the connection position of the robot cleaner and the external recharging device. Returning of the robot cleaner is carried out when the robot cleaner, separated from the external recharging device, completes its job or needs a recharging, by using the previously stored image and an image currently taken by the camera. Accordingly, an error in the location process, mainly caused due to external interference signals, is decreased, and errors in tracing a path and connecting to the external recharging device can also be decreased.

5 Claims, 6 Drawing Sheets

U.S. PATENT DOCUMENTS

| | | | |
|---|---|---|---|
| 5,995,884 A * | 11/1999 | Allen et al. | 701/24 |
| 6,389,329 B1 * | 5/2002 | Colens | 700/262 |
| 6,459,955 B1 * | 10/2002 | Bartsch et al. | 700/245 |
| 6,496,754 B2 * | 12/2002 | Song et al. | 700/245 |
| 6,496,755 B2 * | 12/2002 | Wallach et al. | 700/245 |
| 6,525,509 B1 * | 2/2003 | Petersson et al. | 320/107 |
| 6,532,404 B2 * | 3/2003 | Colens | 700/262 |
| 6,586,908 B2 * | 7/2003 | Petersson et al. | 320/107 |
| 6,600,981 B2 * | 7/2003 | Ruffner | 701/23 |
| 6,611,120 B2 * | 8/2003 | Song et al. | 318/568.12 |

FOREIGN PATENT DOCUMENTS

| | | |
|---|---|---|
| EP | 36339 A2 | 4/1990 |
| JP | 11-259659 | 9/1999 |
| JP | 2000242333 | 9/2000 |

* cited by examiner

ROBOT CLEANER, SYSTEM EMPLOYING THE SAME AND METHOD FOR RE-CONNECTING TO EXTERNAL RECHARGING DEVICE

BACKGROUND OF THE INVENTION

1. Field of the Invention

The present invention relates to an automated robot cleaner, and more particularly, to a robot cleaner, a system employing the same and a method for re-connecting the robot cleaner to an external recharging device efficiently.

2. Description of the Related Art

Generally, a robot cleaner sucks dust or foreign substances from a cleaning surface. The robot cleaner performs a cleaning operation while automatically running on a cleaning area without manipulation by a user.

Since the robot cleaner regularly checks the locations and measures distances to obstacles like furniture, office appliances and walls, the robot cleaner can clean the cleaning area while not colliding with any of the obstacles.

Such a robot cleaner is equipped with a battery, which supplies the power required for the robot cleaner to run. The battery may be recharged by an external recharging device. Accordingly, when the battery needs recharging, the robot cleaner has to locate the external recharging device and return to the external recharging device for recharging, automatically.

For this purpose, the robot cleaner usually uses a high frequency signal that is received from the external recharging device to detect the location of the external recharging device.

This way, however, has some shortcomings in that the level of high frequency signal can be varied by external factors such as reflective waves and/or interference waves, and by the variation of the high frequency signal level. These different factors will cause the robot cleaner to not find the exact location needed to dock with the external recharging device.

SUMMARY OF THE INVENTION

The present invention has been made to overcome the above-mentioned problems or shortcomings of the related art, and accordingly, it is an object of the present invention to provide a robot cleaner, a system employing the same and a method for re-connecting the robot cleaner to an external recharging device.

Another object of the present invention is to provide an external recharging device which allows for an easy access and re-connection of the robot cleaner to the external recharging device.

The above objects are accomplished by a robot cleaner for performing a job while wirelessly communicating with an external device according to the present invention, including a driving portion for driving a plurality of wheels, at least one camera installed on a body of the robot cleaner, the camera for photographing external surroundings, and a controller for photographing an image through a camera for recognition of a connection position where the external recharging device is connected with the robot cleaner and storing the photographed image, and for controlling the driving portion so that the robot cleaner can move from the external recharging device to a destination when an operation start signal is received in the robot cleaner connected to the external recharging device, and for tracing a path to the connection position of the external recharging device and the robot cleaner during a robot cleaner's return to the external recharging device while comparing a current image currently taken by the camera with a stored image of the connection position of the robot cleaner and the external recharging device.

The camera includes an upper camera mounted on the body of the robot cleaner to photograph an object vertically above the robot cleaner with respect to a running direction. The controller receives an image above the external recharging device from the upper camera on the robot cleaner that is connected to the external recharging device, to photograph the image and store the received image as the image of the connection position. The controller traces a path to the external recharging device when the robot cleaner returns to the external recharging device by comparing the image taken by the upper camera with the stored image of the connection position.

Preferably, the robot cleaner further includes a power level detect portion for detecting the power level of a battery that is mounted on the body in a removable manner with respect to the external recharging device. The controller stops the job upon receipt of a recharging request signal from the power level detect portion, and controls the driving portion so that the robot cleaner can return to the external recharging device.

The robot cleaner further includes a front camera mounted on the body of the robot cleaner to photograph an image in front of the robot cleaner in a running direction. The controller receives the image in front of the external recharging device taken by the front camera and stores the received image as an image of connection position of the robot cleaner and the external recharging device, and the controller traces a path to the external recharging device by comparing the image taken by the front camera with the stored image of the connection position of the robot cleaner and the external recharging device when the robot cleaner returns to the external recharging device.

The above objects are also accomplished by a robot cleaner system according to the present invention, including a remote controller wirelessly communicating with a robot cleaner that has a driving portion formed of a plurality of wheels and at least one camera mounted on a body of the robot cleaner to photograph external surroundings. The remote controller receives an image from the camera for a recognition of a connection position of the robot cleaner and an external recharging device and storing the received image. The remote controller controls the driving portion so that the robot cleaner can move to a destination from the external recharging device when an operation start signal is received in the robot cleaner connected to the external recharging device, and controls the robot cleaner so that the robot cleaner can connect to the external recharging device by comparing a current image taken by the camera with a stored image of the connection position of the robot cleaner and the external recharging device.

Preferably, the remote controller receives from the upper camera the image above the external recharging device taken when the robot cleaner is connected to the external recharging device, and stores the received image as the image of the connection position for recharging.

It is also preferable that the remote controller stops the robot cleaner upon receipt of a recharging request signal generated at the power level detect portion and transmitted from the robot cleaner, and controls the driving portion so that the robot cleaner can return to the external recharging device.

The above objects are also accomplished by an external recharging device for recharging a robot cleaner that wirelessly communicates with the external recharging device while performing a cleaning operation and having a camera for photographing external surroundings. According to the present invention, the external recharging device includes a body, on which a power supply terminal is installed for a connection with a recharging terminal of a battery of the robot cleaner. A guide member is formed at a certain position on the body so as to be photographed by the camera of the robot cleaner A recharging position guiding mark is formed at a certain position on the guide member so as to be photographed by the camera of the robot cleaner.

Preferably, the external recharging device includes a seating portion in which a groove is formed to receive a part of the wheels of the robot cleaner being in a position where a recharging terminal of the robot cleaner is connected to the power supply terminal.

The guide member is formed from the seating portion to a predetermined height in parallel to the seating portion, and has the recharging position guiding mark formed on a bottom surface thereof.

Further, the external recharging device according to the present invention includes a guide wall extending from the seating portion to a predetermined height, for an advance or withdrawal of the robot cleaner into/from the seating portion. The guide member and the recharging position guiding mark are extended by a predetermined length corresponding to a distance from the guide wall to the seating portion for a photographing by the camera of the robot cleaner.

The recharging position guiding mark is extended in a linear pattern by a predetermined length.

According to another aspect of the present invention, the guide member is formed on the body in a vertical relation to the body by a predetermined height, and the recharging position guiding mark is formed on the guide member, in a position where the guiding mark can be photographed by a front camera of the robot cleaner.

The guide member is formed in a position facing the front camera of the robot cleaner as seated on the seating portion of the robot cleaner.

Further, the above objects are also accomplished by a method of a robot cleaner for returning to an external recharging device according to the present invention, including the steps of: when an operation-start signal is received to the robot cleaner connected to the external recharging device, photographing through a camera of the robot cleaner an image for a recognition of recharging position, for the robot cleaner to recognize a connection position where the robot cleaner is connected to the external recharging device; performing an assigned job by running the robot cleaner; and when the robot cleaner needs a recharging, or when the assigned job is completed, tracing a path to the external recharging device by comparing a current image currently taken by the camera with the stored image for the recognition of recharging position, and returning the robot cleaner to the external recharging device.

BRIEF DESCRIPTION OF THE DRAWINGS

The above-mentioned object and the feature of the present invention will be more apparent by describing the preferred embodiments of the present invention by referring to the appended drawings, in which.

DETAILED DESCRIPTION OF THE PREFERRED EMBODIMENTS

From now on, the present invention will be described in greater detail by referring to the appended drawings.

Figure 1:
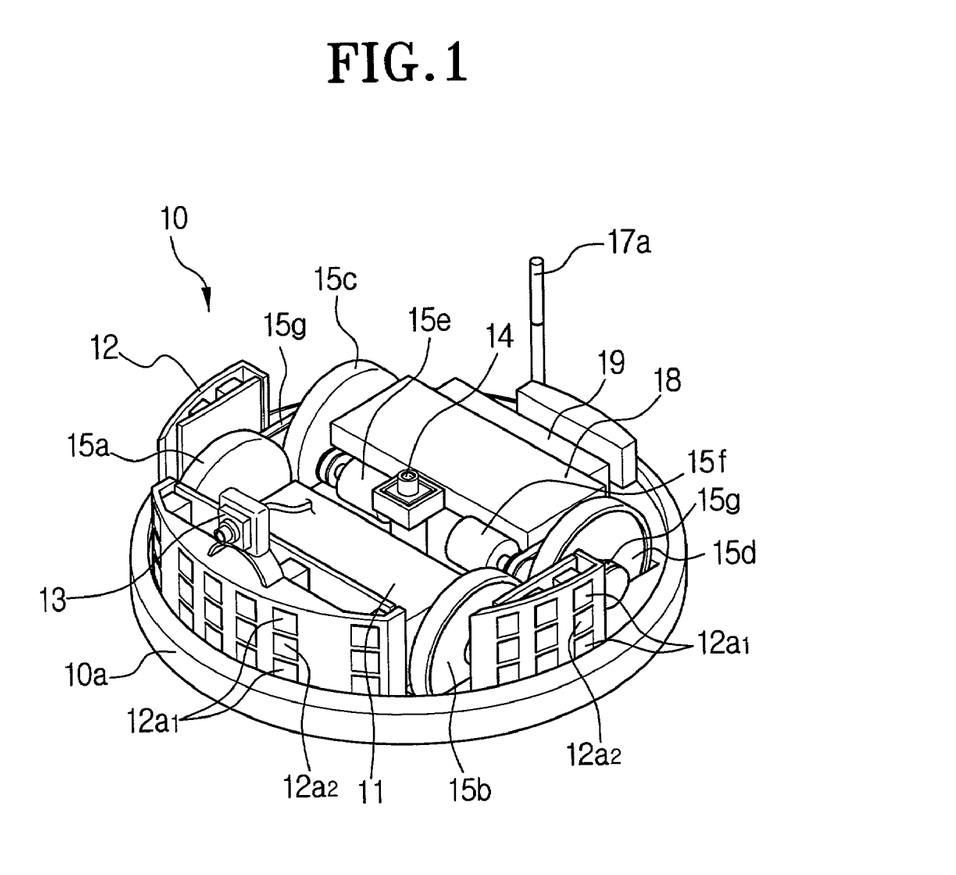
FIG. 1 is a perspective view showing a robot cleaner according to the present invention from which a cover is separated.
Figure 2:
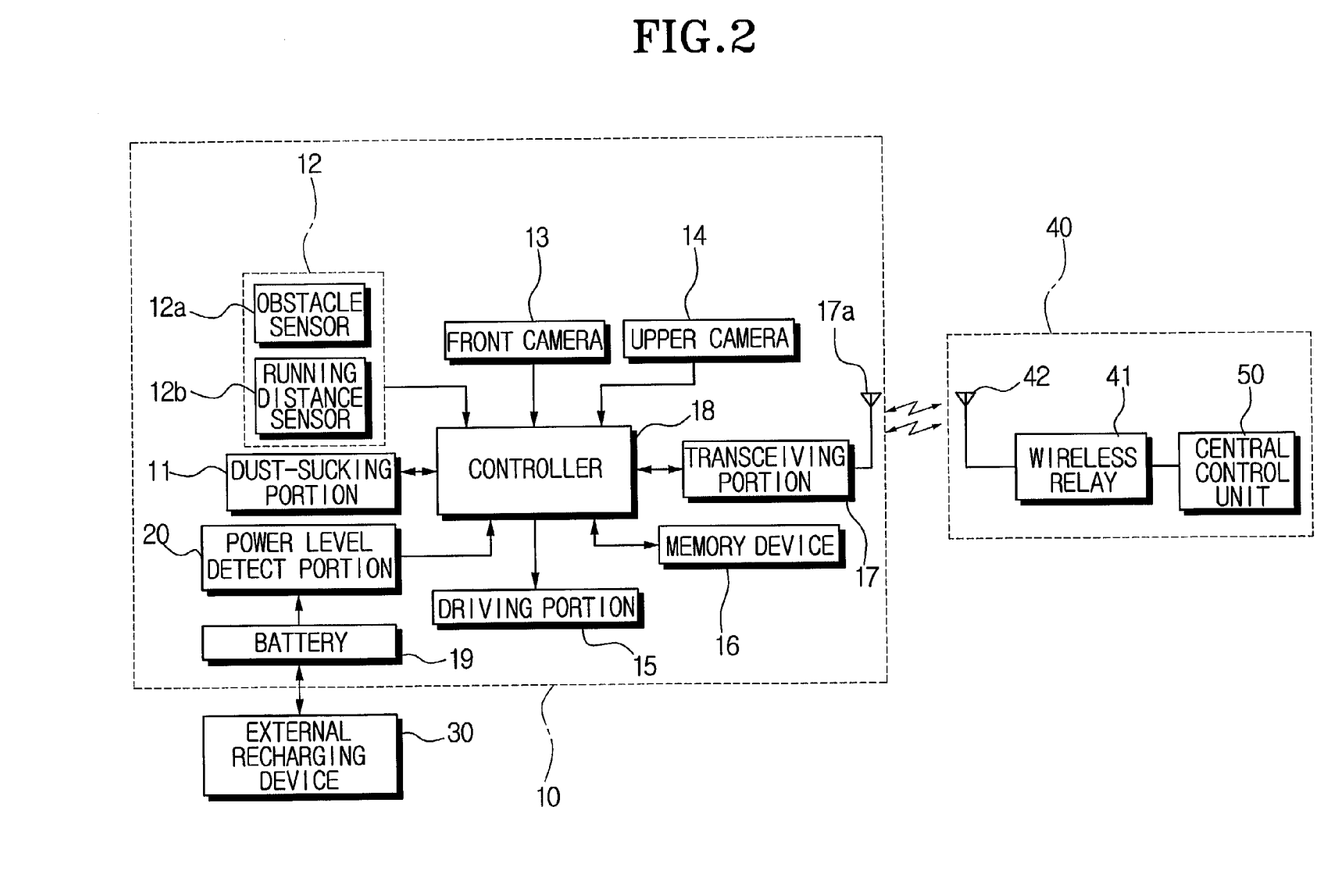
FIG. 2 is a block diagram showing a robot cleaner system to which the robot cleaner of FIG. 1 is applied.

FIG. 1 is a perspective view showing a robot cleaner according to the present invention from which a cover is separated, and FIG. 2 is a block diagram showing the robot cleaner system to which the robot cleaner of FIG. 1 is applied.

Referring to drawings, the robot cleaner 10 includes a dust-sucking portion 11, a sensor portion 12, a front camera 13, an upper camera 14, a driving portion 15, a transceiving portion 17, a control portion 18 and a battery 19.

The dust-sucking portion 11 is formed on a body 10a of the robot cleaner 10 so as to draw in dusts from opposite area of the floor with the air suctioning operation. The dust-sucking portion 11 can be constructed in the generally known ways to those skilled in the art. For example, the dust-sucking portion 11 can have a suction motor (not shown) and a dust chamber that collects the dusts sucked through a suction pipe oppositely formed with respect to the floor by the driving of the suction motor. The above example should not be seen as to limit the scope of the present invention.

The sensor portion 12 includes obstacle sensors 12a formed on the surface of the body at a predetermined interval from each other to send out and receive signals, and a distance sensor 12b that measures a running distance.

Each obstacle sensor 12a includes an infrared light emitting element 12a1 that emits an infrared ray of light, and a plurality of light receiving elements that receive reflected rays. The plurality of light receiving elements is arranged along an outer circumference of the obstacle sensor 12a in a vertical pattern. Alternatively, the obstacle sensor 12a may be formed of an ultrasound sensor that emits ultrasound wave and receives the reflected waves. The obstacle sensor 12a can be used to measure the distance to the wall.

The distance sensor 12b can be formed of a rotation detect sensor that detects the number of revolution of wheels 15a through 15d. For example, the rotation detect sensor can be an encoder that detects the number of revolution of motors 15e and 15f.

The front camera 13 is installed on the body 10a to photograph objects in front and output the photographed image to the control portion 18.

Alternatively, a pan or a tilt camera can also be used to photograph the objects in front and above.

The driving portion 15 includes a pair of front wheels 15a and 15b installed at both front sides, a pair of rear wheels 15c and 15d installed at both rear sides, a pair of motors 15e and 15f that rotate the pair of rear wheels 15c and 15d and a timing belt 15g that transmits the driving force generated from the rear wheels 15c and 15d to the front wheels 15a and 15b. According to the control signal from the controlling portion 18, the driving portion 15 drives one motor 15e in a certain direction and the other motor 15f in the reverse direction. Rotation in the opposite directions can be achieved by driving the motors 15e and 15f at different RPMs.

Alternatively, that is, instead of the wheels, the driving portion 15 can be constructed to a crawler-type.

The transceiving portion 17 sends out data to an antenna 17a, receives signals from the antenna 17a and transmits the received signal to the controlling portion 18.

The battery 19 is installed on the body 10a so that it can be recharged by an external recharging device 30 through a battery recharging terminal (not shown). The battery recharging terminal is installed on the outer surface of the body 10a in a manner that the battery recharging terminal is connected to and separated from the external recharging device 30.

A battery charging level detecting portion 20 detects the charging level of the battery 19, and sends out a request signal for recharging when detecting a result that indicates the lower charging level.

The external recharging device 30 is constructed such that it is supplied with electricity through a power cord connectible to a commonly used AC power resource and then feeds the supplied electricity to the robot cleaner 10 through the power supply terminals.

Figure 4:
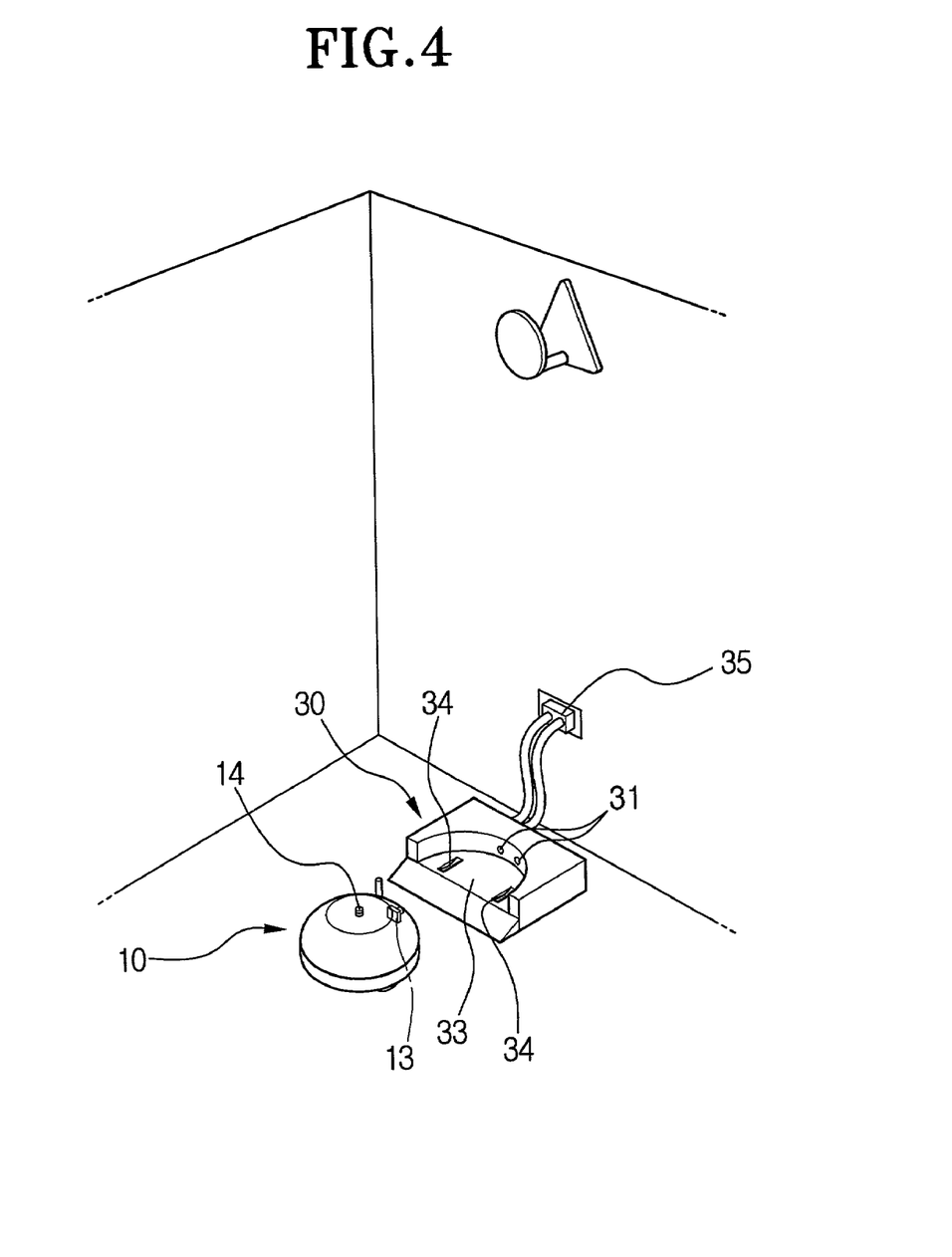
FIG. 4 is a perspective view showing one example in which an external recharging device recharges the robot cleaner of FIG. 1.

FIG. 4 shows one example of the external recharging device 30.

As shown in FIG. 4, the external recharging device 30 has a seating portion 33 formed on the body thereof. The robot cleaner 10 is seated on the seating portion 33.

The seating portion 33 has an open forward portion through which the robot cleaner 10 is inputted and withdrawn. Also, grooves 34 are formed in the seating portion 33 to receive the wheels 15 of the robot cleaner 10 partly. The grooves 34 correspond to the location of the wheels 15 of the robot cleaner at a normal seating position.

The power supply terminals 31 are formed in a rear wall of the seating portion 33 so that, when the robot cleaner 10 is seated at a normal position, the power supply terminals 31 are connected to the recharging terminals of the battery 19 of the robot cleaner 10. The power supply terminals 31 are connected to the power cord 35 through an internal voltage transformer and power cable. The internal voltage transformer may be omitted.

Figure 5:
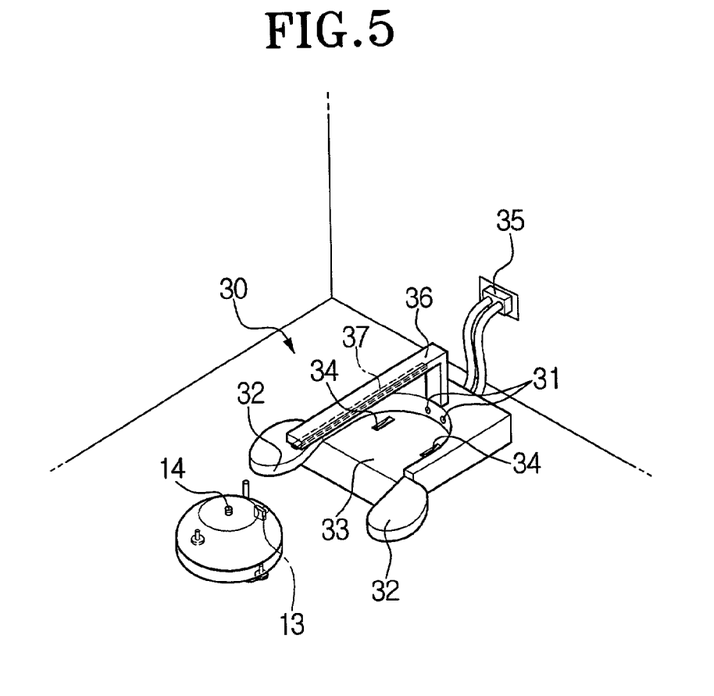
FIG. 5 is a perspective view showing an external recharging device according to the second preferred embodiment of the present invention.

FIG. 5 shows another example of the external recharging device 30 constructed for easier location of the recharging position and an easier advancing of the external recharging device 30. Here, the like elements are designated with the same reference numerals of the previous drawings.

Referring to FIG. 5, the external recharging device 30 includes an upper guide member 36, distanced above from the seating portion 33 by a predetermined distance in a parallel relation thereto.

Further, guide walls 32 are extended frontward from the sidewalls of the seating portion 33 in a manner that the guide walls 32 are inclined outward, gradually increasing the opening width so as to allow easier advancement of the robot cleaner 10 into the seating portion 33.

Being supported on and distanced upward from the seating portion 33 by a predetermined distance in parallel to the seating portion 33, the guide member 36 has the shape of alphabet 'L'.

In order to allow the upper camera 14 of the robot cleaner 10 to photograph from the guide walls 32 to the seating portion 33, the horizontal portion of the guide member 36 in parallel to the seating portion 33 extends from a position corresponding to the seating portion 33 to a position corresponding to the guide walls 32.

An upper recharging position mark is formed on the bottom surface of the guide member 36 in a linear manner for an easy recognition during the photographing of the upper camera 14. The upper recharging position mark helps to guide the robot cleaner 10 during its advancement into the seating portion 33. The upper guiding mark 37 is colored distinguishably from the rest of the bottom of the guide member 36, so that the upper guiding mark 37 can be distinguished from the other parts during image processing. For example, the guiding mark 37 can be colored black, while the rest of the area is colored white.

Figure 6:
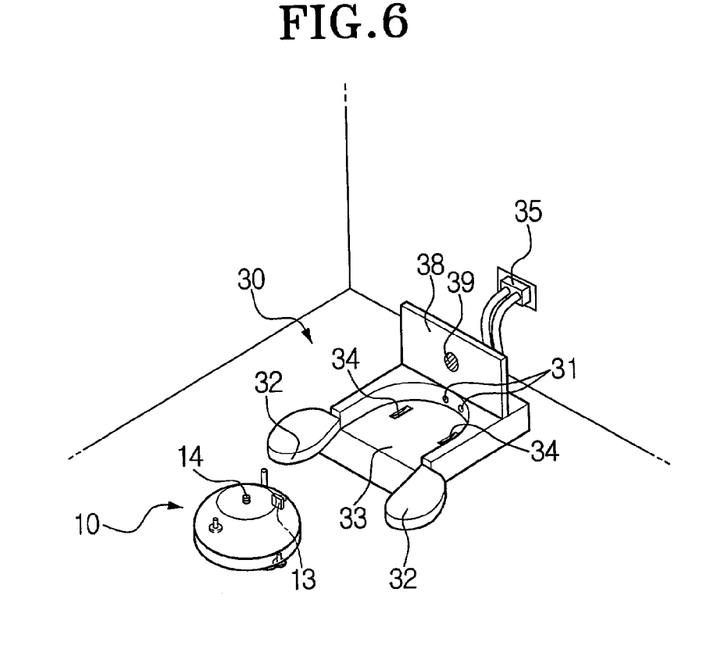
FIG. 6 is a perspective view of an external recharging device according to the third preferred embodiment of the present invention.

FIG. 6 is a perspective view showing an external recharging device according to the third preferred embodiment of the present invention. Here, the like elements are designated by the same reference numerals of the previous drawings.

Referring to FIG. 6, the external recharging device 30 includes a vertical guide member 38 vertically formed on a side of the seating portion 33.

The vertical guide member 38 protrudes from the seating portion 33 to a predetermined height where the vertical guide member 38 faces the front camera 13 of the robot cleaner 10 as seated on the seating portion 33.

The vertical guide member 38 is at a higher height than the front camera 13 of the robot cleaner 10 as seated on the seating portion 33.

For an easier recognition of the image during the photographing of the front camera 13 and also for an easier determination of the robot cleaner 10 about the recharging position, there is a circular recharging position guiding mark 39 formed somewhere near the center of the vertical guide member 38.

The recharging position guiding mark 39 and the rest of the vertical guide member 38 are colored differently.

The control portion 18 processes signals received through the transceiving portion 17 and accordingly controls the respective elements. If there is a key input device (not shown) on the body 10a having a plurality of keys for setting functions of the respective devices, the control portion 18 processes key signals inputted through the key input device.

In non-operation of the robot cleaner 10, the control portion 18 controls the respective elements so that the robot cleaner 10 can be on standby while being connected to and thus recharged by the external recharging device 30. By connecting the robot cleaner 10 to the external recharging device 30 in non-operation, the battery 19 maintains a certain charging level.

When an operation-start signal is received, the control portion 18, being connected to the external recharging device 30, stores in the memory device 16 the images of objects above the external recharging device 30 photographed by the upper camera 14 and/or images of objects in front of the external recharging device 30 photographed by the front camera 13.

That is, when using the external recharging device of FIG. 4 or FIG. 5, the control portion 18 stores the images of equipments or ornaments above, or the images of the upper guiding mark 37, all of which are taken by the upper camera 14.

When using the external recharging device of FIG. 6, the control portion 18 stores in the memory device 16 the images of circular recharging position guiding mark 39 taken by the front camera 13 facing the circular recharging position guiding mark 39, in a state that the robot cleaner 10 is connected to the external recharging device 30 and/or in a state that the robot cleaner 10 is retreated from the external recharging device 30 by a predetermined distance.

The operation start signal is for cleaning operation or monitoring operation with the cameras 12 and 14.

When the robot cleaner 10 returns to the external recharging device 30, the control portion 18 compares the current images taken by the upper camera 14 and/or by the front camera 13 with the stored images of recharging position for a determination on the recharging position, and accordingly controls the driving portion 15 so that the robot cleaner 10 can dock to the external recharging device 30.

That is, when the robot cleaner 10 returns to the external recharging device 30, the control portion 18 recognizes the distance and direction of the robot cleaner 10 with respect to the external recharging device 30 by comparing the stored images above and/or in front of the external recharging device 30 with the currently taken images above and/or in front of the robot cleaner 10. Accordingly, the control portion 18 controls the driving portion 15 so that the robot cleaner 10 can return from the current position to the destination, i.e., to the external recharging device 30. When running on a path to the destination, the control portion 18 controls the driving portion 15 based on the information about current position that is obtained through the running distance measured by the encoder and by comparing the currently taken images above and/or images in front with the stored images, so that the robot cleaner 10 can trace the path to the destination.

In the above-described examples, the control portion 18 directly photographs and stores the images above and/or in front of the external recharging device 30, and the robot cleaner 10 is returned to the external recharging device 30 by using the images as stored and the images currently taken.

According to another aspect of the present invention, in order to reduce the image processing load of the robot cleaner 10, a robot cleaner system is provided to externally handle processes for the return of the robot cleaner 10 such as storage/analysis of the images above and/or images in front.

Accordingly, the robot cleaner 10 is constructed to wirelessly send out images photographed by the cameras 13 and 14 and operate in accordance with the control signals wirelessly received from outside. Also, a remote controller 40 is provided to wirelessly control the robot cleaner 10 in the processes such as operation control, return to the recharging device 30, or the like.

The remote controller 40 includes a wireless relay 41 and a central control unit 50.

The wireless relay 41 processes wireless signals received from the robot cleaner 10 and then transmits the processed signals to the central control unit 50 through a wire. Then the wireless relay 41 wirelessly sends out the signals received from the central control unit 50 to the robot cleaner 41 through the antenna 42.

Figure 3:
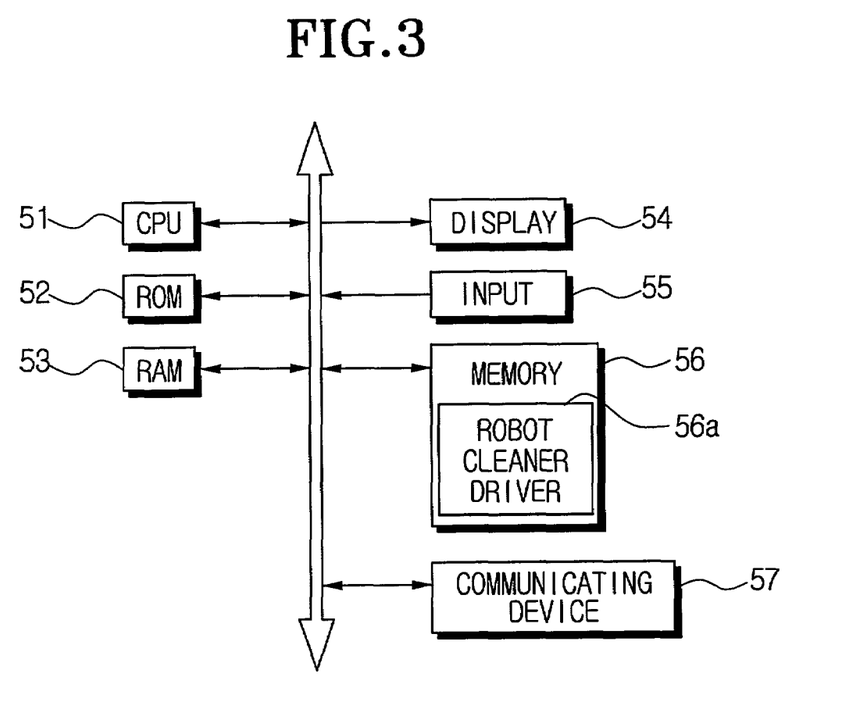
FIG. 3 is a block diagram of a central control unit of FIG. 2.

A general computer can serve as the central control unit 50, as it is shown in FIG. 3. As shown in FIG. 3, the central control unit 50 includes a central processing unit (CPU, 51), a read-only memory (ROM, 52), a random access memory (RAM, 53), a display 54, an input device 55, a memory 56 and a communication device 57.

The memory 56 has a robot cleaner driver 56*a* that controls the robot cleaner 10 and also processes signals transmitted from the robot cleaner 10.

When activated, the robot cleaner driver 56*a* provides a menu on the display 54 for a user's setting of the robot cleaner control. When a user makes a selection from the menu, the robot cleaner driver 56*a* processes so that the robot cleaner 10 can perform the item selected by the user. Preferably, the menu is divided into big categories like cleaning operation and monitoring operation, and the big categories are provided with a sub-selection menu that provides a plurality of menus supported by the appliance in use like targeting area selecting list, operation method, or the like.

When an operation start signal is inputted to the robot cleaner 10 at a predetermined time or through the input device 55, from the robot cleaner 10, the driver 56*a* receives and stores in the memory 56 the images of the external recharging device 30 that are taken by the upper camera 14 and/or images above and/or images in front of the external recharging device 30 that are taken by the front camera 13 of the robot cleaner 10 on standby connected to the external recharging device 30. After that, the driver 56*a* controls the robot cleaner 10 so that the robot cleaner 10 could carry out a job as ordered. According to the control information received from the driver 56*a* through the wireless relay 41, the control portion 18 of the robot cleaner 10 controls the driving portion 15 and/or dust-sucking portion 11, and transmits the images above the robot cleaner 10 that are taken by the upper camera 14 and/or the images in front of the robot cleaner 10 that are taken by the front camera 13 to the central control unit 50 through the wireless relay 41.

Upon receipt of a battery recharging request signal from the robot cleaner 10, or determining the completion of job, the driver 56*a* controls the robot cleaner 10 so that the robot cleaner 10 could return to the external recharging device 30. During the controlling, the driver 56*a* compares the images above and/or in front of the external recharging device 30 that are stored in the memory 56 with the current images above and/or in front the robot cleaner 10 taken by the upper camera 14 and/or front camera 13 and transmitted, traces a path to the external recharging device 30, and controls the robot cleaner 10 to return to the exact position of the external recharging device 30.

Figure 7:
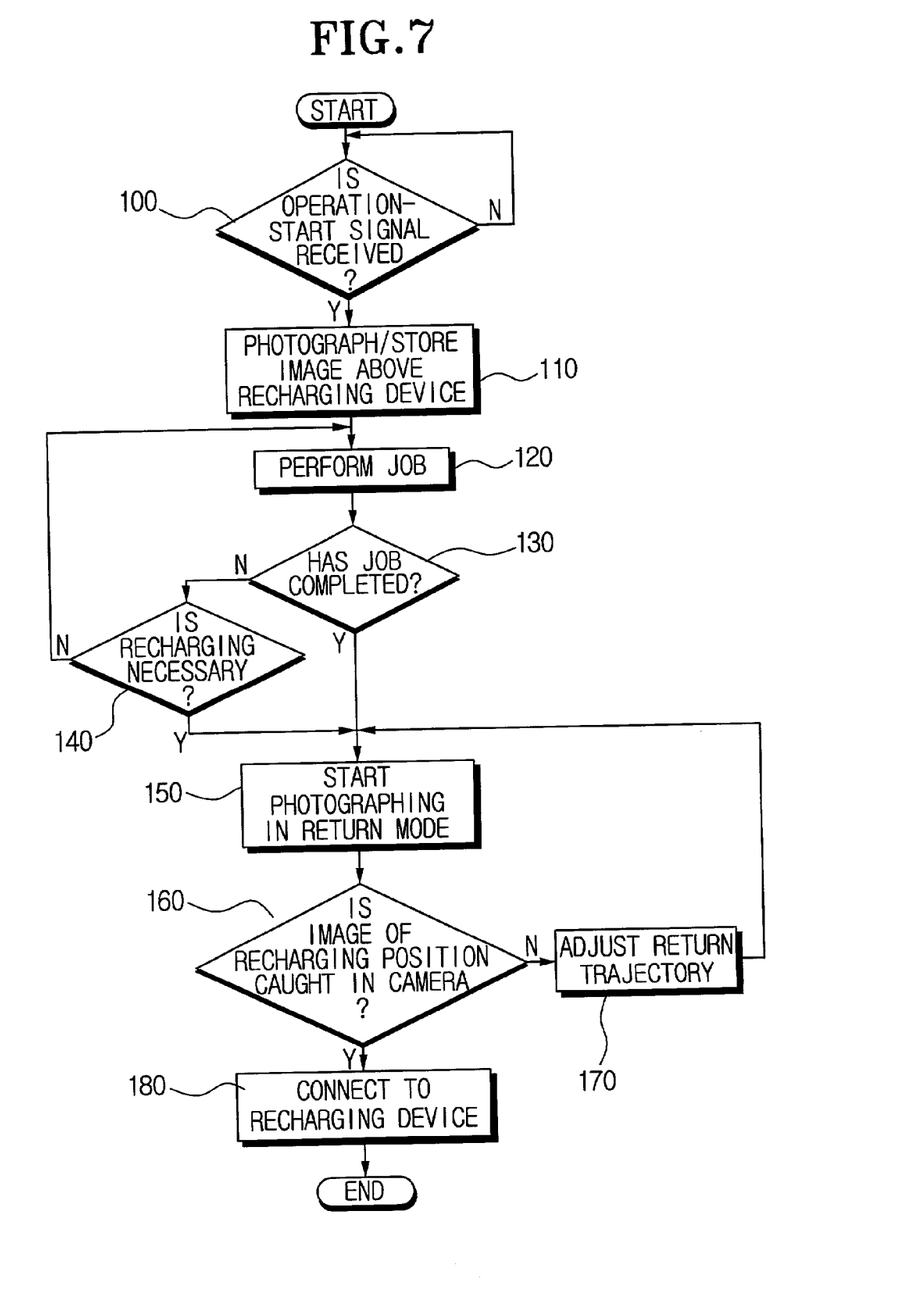
FIG. 7 is a flowchart for explaining a process of the robot cleaner of returning to the external recharging device according to the present invention.

The process of tracing a path to the external recharging device 30 will be described below in greater detail with reference to FIG. 7.

In the below description, the initial state is that the robot cleaner 10 is on standby, connected to the external recharging device 30.

First, it is determined whether the operation start signal has been received or not (step S100).

When determining that the operation start signal has been received, the images of the recharging position are photographed and stored for use when the robot cleaner 10 needs to recognize the position of the external recharging device 30 (step S110).

Here, the 'images of recharging position' are the images above and/or in front of the external recharging device 30 that are taken when the robot cleaner 10 is connected to the external recharging device 30. When using the external recharging devices of FIGS. 5 and 6, the images of upper guiding mark 37 or the circular guiding mark 39 serve as the images of recharging position.

When the photographing and storage of the images of the recharging position are completed, operation is carried out as ordered (step S120). That is, when the cleaning operation is ordered, the robot cleaner 10 is driven, thus separated from the connection with the external recharging device 30 and runs on a predetermined path. During the running of the robot cleaner 10, the dust-sucking portion 11 of the robot cleaner 10 is driven, sucking in foreign substances from the cleaning surface. If the monitoring operation is ordered, the robot cleaner 10 is driven and thus separated from the connection with the external recharging device 30 to a monitoring destination, photographs the targeting objects with the cameras 13 and 14, and transmits or records the photographs.

Next, it is determined whether the operation has completed or not (step S130).

When it is determined that the operation has not completed yet in S130, it is determined whether the recharging is required or not (step S140).

When it is determined that the operation has completed, or recharging is needed, returning process to the recharging position is performed.

In the returning mode, a returning trajectory, i.e., distance and direction to the external recharging device 30 are calculated, by using trajectory information on the movement of the robot cleaner 10 that is measured since the separation of the robot cleaner 10 from the external recharging device 30 and/or images around the robot cleaner 10 that are taken by the cameras 13 and 14 and stored since the separation of the robot cleaner 10 from the external recharging device 30. Then, according to the calculated trajectory information on the movement of the robot cleaner 10, the driving portion 15 is controlled to return to the external recharging device 30.

During the separation and returning of the robot cleaner 10 from/to the external recharging device 30, it is preferable to determine the position by using information obtained and recognized by comparing the running distance measured by the encoder, current images taken by the cameras 13 and 14 and the stored images.

In the process of the robot cleaner's 10 returning to the external recharging device 30, it is determined whether the stored images of recharging position are caught by the cameras 13 and 14 or not (step S160). More specifically, it is determined whether the images taken by the upper camera 14 or the front camera 13 include the images above the recharging position or images of recharging position guiding marks 37 and 39, completely or partially.

When it is determined that the current image does not include the images of recharging position, the return trajectory of the robot cleaner 10 to the recharging position is adjusted (step S170).

The adjustments to the returning trajectory include processes like a turning or advancement of the robot cleaner 10 by a predetermined angle or distance.

Until the image of recharging position is included in the current image, the steps from S150 to S170 are repeated.

When it is determined that the image of recharging position is included in the current image after the above-mentioned processes, the robot cleaner 10 is connected to the external recharging device 30 (step S180).

The following are examples when using the external recharging device 30 of FIG. 4 or FIG. 5. In this case, when the stored images above the external recharging device 30 or the upper guiding mark 37 is caught and photographed by the upper camera 14 in S160, the robot cleaner 10 is advanced into the seating portion 33 based on the image information about the images above the external recharging device 30 or the upper guiding mark 37. More specifically, when the robot cleaner 10 almost reaches the external recharging device 30 and thus some parts of the image above the external recharging device 30 or the upper guiding mark 37 stored in the upper camera 14 are caught, the robot cleaner 10 advances into the seating portion 33 of the external recharging device 30 while adjusting its trajectory based on the information about the position of the guiding mark in a screen that is currently photographed. Accordingly, the upper image or the upper guiding mark 37 can trace a predetermined trajectory on the screen.

The following are cases when using the external recharging device 30 of FIG. 6. In this case, when the recharging position guiding mark 37 is caught at the front camera 13 in S160, the connection of the robot cleaner 10 to the external recharging device 30 is performed based on the image information of the guiding mark 37 in S180 that will be described below. That is, the photograph of the current recharging position circular guiding mark 39 is compared with the stored image of the recharging position guiding mark 39 in size, degree of distortion and location within the screen, and the robot cleaner 10 is returned to the recharging position along a return trajectory that matches the current image of the circular guiding mark 39 with the stored image of the circular guiding mark 39 (step S180).

When the image of the recharging position is caught in the camera 13, based on the position information on the screen of the recharging position image currently taken, the advancement and positioning of the robot cleaner 10 in the seating portion 33 can be performed with ease, and with decrease in the docking error rate.

As described above, with the robot cleaner 10, a system thereof and a method of tracing a path to the external recharging device 30 according to the present invention, the robot cleaner 10, which was separated from the external recharging device 30, can return to the external recharging device 30 by using the images of the recharging position previously stored and the images of the current position taken by the camera, when the robot cleaner 10 completed its cleaning operation or needs recharging. Accordingly, an error rate in recognizing the position, which often occurs due to the external interference signal, can be reduced, and also, errors in tracing a path to the recharging device and connecting the robot cleaner 10 to the external recharging device 30 can be decreased.

So far, the preferred embodiments of the present invention have been illustrated and described. However, the present invention is not limited to the preferred embodiments described here, and someone skilled in the art can modify the present invention without distorting the point of the present invention claimed in the claim part.

What is claimed is:

1. A robot cleaning system comprising:
   a robot cleaner; and
   an external recharging device;
   wherein the robot cleaner comprises:
      a driving portion for driving a plurality of wheels;
      at least one camera installed on a body of the robot cleaner, the camera for photographing external surroundings;
      an obstacle sensor;
      a distance sensor to measure a running distance of the robot cleaner; and
      a controller for photographing an image through the camera for a recognition of a connection position where the external recharging device is connected with the robot cleaner and storing the photographed image, wherein the controller is used for controlling the driving portion so that the robot cleaner can move from the external recharging device to a destination when an operation start signal is received in the robot cleaner connected to the external recharging device, wherein the controller is used for tracing a path to the connection position of the external recharging device and the robot cleaner during a robot cleaner's return to the external recharging device while comparing a current image currently taken by the camera with a stored image of the connection position of the robot cleaner and the external recharging device;

wherein the external recharging device comprises:
a body member;
sidewalls coupled to the body member for forming a seated section in the body member for holding the robot cleaner; and
guide members coupled to the body member for guiding the robot cleaner into the seated section of the body member, wherein the guide members comprises:
an upper guide member coupled to the body member and positioned above the seated section;
side guide members extending frontward from the sidewalls, wherein the side guides gradually increase an opening width for guiding the robot cleaner into the seated section of the body member; and
a pair of wheel grooves formed in the seated section for positioning the robot cleaner in the seated section.

2. The robot cleaner of claim 1, wherein the camera comprises an upper camera mounted on the body of the robot cleaner to photograph an object vertically above the robot cleaner with respect to a running direction, and the controller receives an image above the external recharging device from the upper camera on the robot cleaner that is connected to the external recharging device, to photograph the image and store the received image, as the image of the connection position, and traces a path to the external recharging device when the robot cleaner returns to the external recharging device by comparing the image taken by the upper camera with the stored image of the connection position.

3. The robot cleaner of claim 1, further comprising a power level detect portion for detecting the power level of a battery that is mounted on the body in a removable manner with respect to the external recharging device, wherein the controller stops the job upon receipt of a recharging request signal from the power level detect portion, and controls the driving portion so that the robot cleaner can return to the external recharging device.

4. The robot cleaner of claim 1, wherein the controller controls the driving portion so that the robot cleaner can return to the external recharging device when the robot cleaner completes a cleaning job.

5. The robot cleaner of claim 1, further comprising a front camera mounted on the body of the robot cleaner to photograph an image in front of the robot cleaner in a running direction, wherein the controller receives the image in front of the external recharging device taken by the front camera and stores the received image as an image of connection position of the robot cleaner and the external recharging device, and traces a path to the external recharging device by comparing the image taken by the front camera with the stored image of the connection position of the robot cleaner and the external recharging device when the robot cleaner returns to the external recharging device.

* * * * *